United States Patent [19]

Jakes et al.

[11] 3,980,170

[45] Sept. 14, 1976

[54] DRIVE SYSTEM FOR AN ANNEALING LEHR

[75] Inventors: Gerald A. Jakes, Toledo; Raymond E. Bond, Newburry, both of Ohio

[73] Assignee: Reliance Electric Company, Pepper Pike, Ohio

[22] Filed: Dec. 23, 1974

[21] Appl. No.: 536,938

[52] U.S. Cl. .............................. 198/782; 198/784; 198/788; 65/172; 318/85

[51] Int. Cl.[2] .............................. B65G 21/12

[58] Field of Search ........... 198/127 R, 127 E, 110, 198/203; 318/85, 110; 65/171, 253, 173, 118, 172, 27, 356

[56] References Cited

UNITED STATES PATENTS

| | | | |
|---|---|---|---|
| 3,382,964 | 5/1968 | Bonhoff et al. | 198/127 R |
| 3,600,655 | 8/1971 | Karlin | 318/85 |
| 3,669,243 | 6/1972 | Fischbacher | 198/127 R |
| 3,754,880 | 8/1973 | Henderson et al. | 65/27 |
| 3,853,526 | 12/1974 | Hochart | 198/127 R |

FOREIGN PATENTS OR APPLICATIONS

| | | | |
|---|---|---|---|
| 847,941 | 9/1960 | United Kingdom | 318/110 |

*Primary Examiner*—Frank E. Werner
*Assistant Examiner*—James M. Slattery
*Attorney, Agent, or Firm*—Louis V. Granger

[57] ABSTRACT

A drive system is disclosed which is particularly suitable for use in the glass industry. The drive system is for a plurality of conveying mechanisms to support and to move a load which may be discrete glass objects or a strip or sheet of glass. An electrical line shaft is created by using a plurality of squirrel cage synchronous motors which are connected to drive the conveying mechanisms, whether they be transfer mechanisms for discrete objects or rolls for conveying the strip of glass. One or more electrical inverters supply power to the motors so that not only are the motors operated in synchronism but also in phase register. Thus where discrete glass objects are conveyed the phase register of the transfer mechanisms between glass machines prevents glass breakage, and where rolls are conveying a strip of float glass, the phase register prevents difference in phase rotation of the rolls which could mar the surface of the float glass. The drive system also includes the conveying mechanism rolls inside an annealing lehr with the rolls supported in bearing blocks fastened to girders such that the bearing blocks may be lowered to move a particular roll out of physical engagement with the strip of glass within the lehr. This permits rapid replacement of any defective part such as a bearing block, gear drive, or synchronous motor, yet permits uninterrupted production of glass from the lehr.

6 Claims, 5 Drawing Figures

DRIVE SYSTEM FOR AN ANNEALING LEHR

BACKGROUND OF THE INVENTION

The glass industry is quite old, and because much glass is used mechanization came relatively early to the glass industry. What is called flat glass is a strip or sheet of glass somehow removed from the glass furnace and moved horizontally through an annealing lehr to cool the glass from about 1,200° to 1,400°F down to perhaps 200°F to remove strains from the glass by slowly cooling it under controlled heat in the lehr. The practice has long been to have a number of rolls in the lehr spaced perhaps 12, 18 or 24 inches apart to convey the strip of glass through the lehr. Customarily, these rolls were all driven by a mechanical line shaft which ran the length of the lehr and drove perhaps 100 or 200 rolls within the lehr by means of right angle gear boxes equal in number to the number of rolls. These gear boxes generally were special gear boxes to accomodate the lengthening movement of the individual rolls because of the high heat to which the rolls were subjected. Such gear boxes had to have some sliding fit to accomodate the lengthening of the rolls rather than utilizing any thrust bearing which would not permit such lengthening. As a result, the gear boxes were usually of a special design and quite costly.

Another rather recent development in the glass industry is the use of float glass, where the glass from the furnace is floated in a bath of molten metal in order to achieve a mirror-like flat bottom surface to the glass strip. It is then taken off and immediately passed to the annealing lehr for annealing. In such a case it was found that it became imperative that the rolls be ground and polished to a highly polished surface in order to not scratch or mar the float glass. Such glass was used for mirrors and in place of plate glass which previously had required grinding and polishing. For such critical uses it was imperative that the surface of glass be kept free from mar or blemishes. Also, such a float glass furnace and annealing line was something which was critical in requiring close coordination of all parts of the glass machinery line so that a continuous process was achieved with no breakdowns. Such breakdowns could be expensive in lost production and also expensive because the heat of the glass, upon a roll which was stationary rather than turning, could cause a permanent sag or set in a particular roll. Accordingly, most annealing lines were overdesigned as far as mechanical strength and requirements were concerned to minimize breakdowns and this again added to the cost of the mechanical line shaft with the special right angle gear boxes. Also, if one particular roll or pillow blocks journalling the roll should somehow become damaged and the roll stop turning, this could mark the glass so that the entire strip of glass was not useable for its intended purpose.

Also known in the glass industry were machines for the handling of discrete articles such as tumblers or other articles of glassware. For such discrete articles it is quite essential that all of the various machines handling or transferring the discrete articles be synchronized not only in speed but synchronized in phase registration. It will be appreciated that if an article is going to be transferred from one turret-like machine to a rotary transfer arm, there must be exact phase or angular registration in order to effect such transfer without breaking the glassware. Accordingly, mechanical registration was previously used, equivalent to the mechanical line shaft along the lehr.

The prior art has known mechanical line shafts for driving the rolls in an annealing lehr but due to the long length of the lehr these had the additional problems of whiplash on the long line shaft. Some patented systems used chains and sprockets to drive the rolls in the lehr whereas others attempted to use a run of a belt frictionally driving the bottom of the rolls. The prior art has also tried electrical substitutes for a mechanical line shaft, and one of the first was a variable speed DC motor driving an alternator to obtain variable frequency so that this variable frequency could energize variable speed motors. Also tried was an electrical inverter supplying a variable frequency, but this variable frequency was available only from a base speed down to about 5 hertz and, therefore, zero speed of the motors could not be achieved. Both of these systems of variable frequency, namely, the alternator or the inverter, were used to supply only wound rotor synchronous motors and these were a poor choice of motors in the high temperature ambient conditions of the typical glass plant. There was no concept of use of any alternate form of synchronous motors. The wound rotor synchronous motors relied upon current into and out of the rotor by means of brushes and some form of current collectors such as slip rings. Also, the ultra-high reliability requirements of glass plants were caused by the continuous operation of the glass furnace. The motors had to be partially enclosed, such as drip-proof or even totally enclosed, and this increased the operating temperatures of the motors.

Accordingly, for either the float glass industry or the discrete glass article manufacture, what was really wanted was some group of motors to drive conveyor mechanisms wherein the motors would make, for example, one million revolutions and the motors would still be not only in synchronization but still in the same phase.

Accordingly, the problem to be solved is how to achieve an equivalent of a mechanical line shaft or mechanical synchronization, yet effect economy in manufacture and installation of a glass machinery line along with increased reliability and ease of maintenance.

An object of the invention is to obviate the above-mentioned disadvantages of the prior art glass machinery.

Another object of the invention is to provide an electrical line shaft to control the rolls of a glass annealing lehr.

Another object of the invention is to provide a drive system for a plurality of conveying mechanisms wherein electrical synchronization is provided which will maintain not only synchronization but phase registration for all speeds from zero speed to a predetermined maximum speed.

Another object of the invention is to provide a drive system for a group of glass machines operating on discrete glass objects so that synchronization and angular registration of the machinery is accomplished.

Another object of the invention is to provide a drive system wherein rolls of an annealing lehr may be quickly moved downwardly out of contact with the strip of glass being annealed so that the roll or its drive mechanism may be replaced or repaired.

Another object of the invention is to provide a drive system for a plurality of rolls in an annealing lehr with each roll deiven by a squirrel cage synchronous motor and a right-angle gear drive, both supported on the roll itself.

SUMMARY OF THE INVENTION

The invention may be incorporated in a drive system comprising, in combination; a plurality of conveying mechanisms to support and to move load means, a plurality of squirrel-cage synchronous motors connected for driving said conveying mechanisms, and inverter means connected for supplying electrical power to said plurality of motors so that phase register and synchronization of said conveying mechanisms is maintained for all speeds from zero speed to a predetermined maximum speed.

DESCRIPTION OF THE PREFERRED EMBODIMENTS

Figure 1:
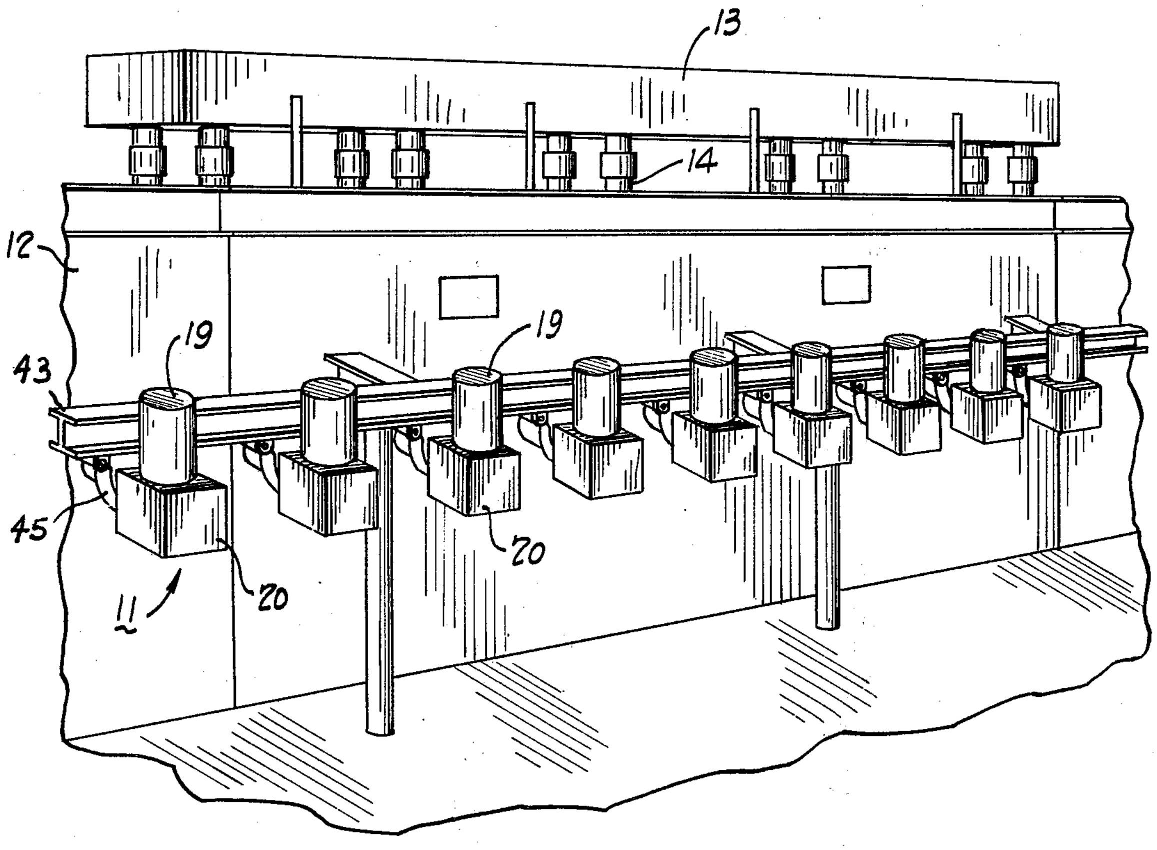
FIG. 1 is a perspective view of a drive system for a glass annealing lehr, which drive system incorporates the present invention.
Figure 4:
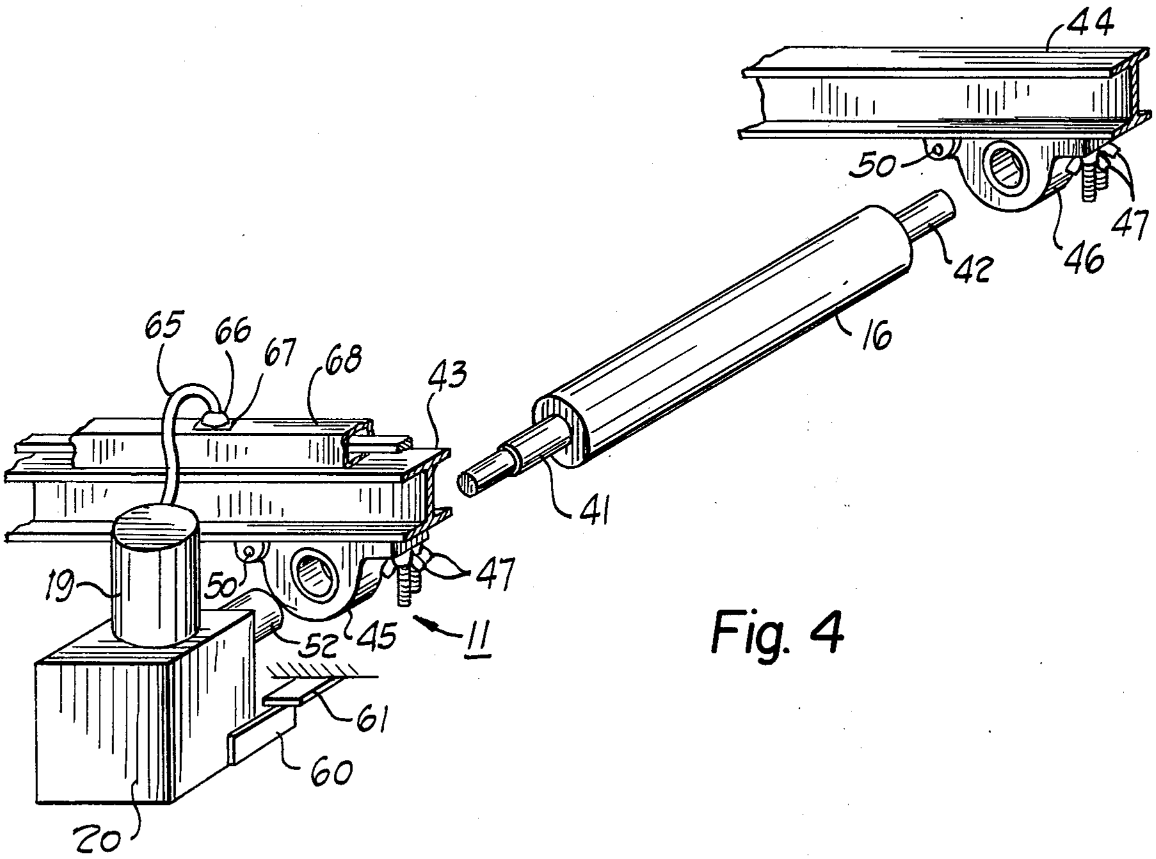
FIG. 4 is a partial perspective view of one of the rolls in the annealing lehr of FIG. 4.
Figure 5:
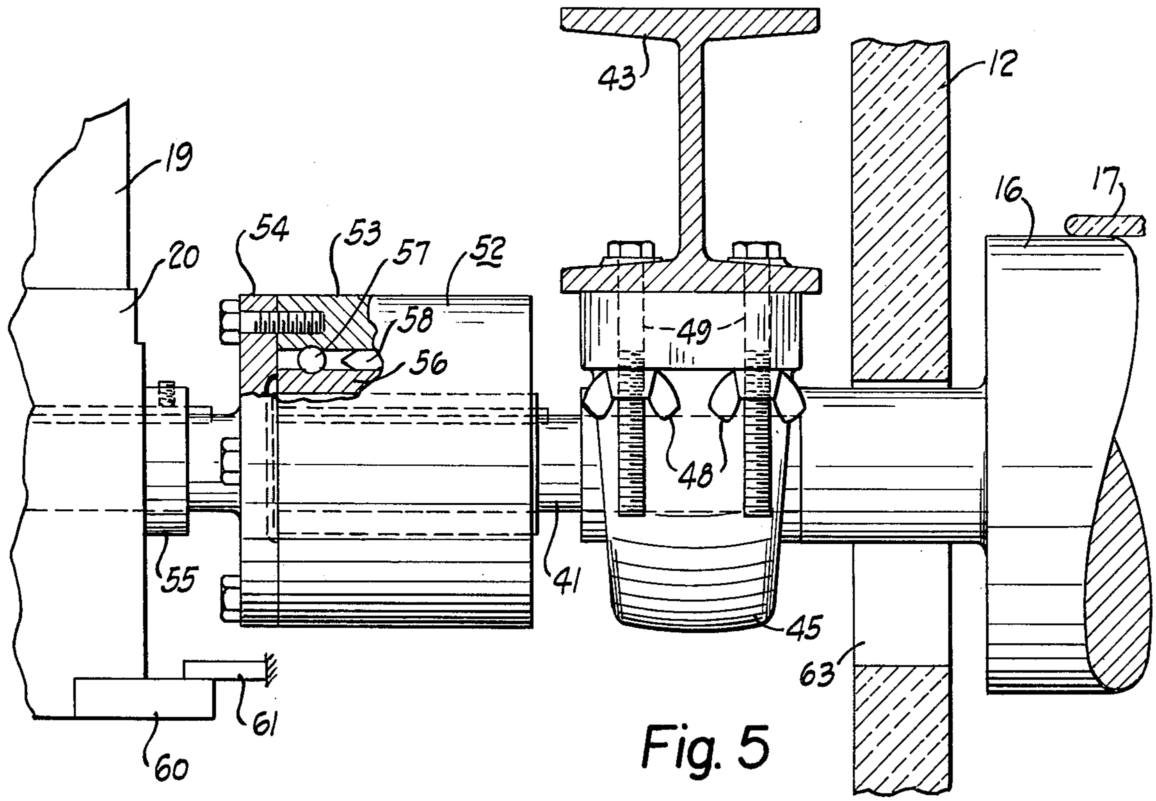
FIG. 5 is a partial longitudinal sectional view of the mechanical connection to the roll of FIG. 4.

FIGS. 1, 2, 4, and 5 show one of the preferred embodiments of the invention of a drive system 11 for a plurality of conveying mechanisms which supports and moves a load. In this FIG. 1, the drive system 11 is shown in connection with the glass industry, and the glass machine shown is a glass annealing lehr 12 to convey and anneal a strip or sheet of flat glass. The lehr has a fuel distribution system 13 with pipes 14 supplying burners, not shown, within the lehr to establish a controlled temperature. This might be 1,200° to 1,400°F at the beginning of the lehr and reducing in a carefully controlled temperature to perhaps 200°F at the exit of the lehr. Such lehr has a conveying mechanism therein shown as rolls 16, one of which is shown in FIGS. 4 and 5. FIG. 5 shows a strip 17 of glass being conveyed by such rolls within the lehr. There may be as many as several hundred such rolls within the long length of the lehr 12, and these rolls 16 are preferably ground and polished rolls. One primary purpose of the present drive system is with a lehr used in the flat glass industry, especially the float glass process wherein the glass is floated on a bath of molten tin and within an inert atmosphere to achieve a flat and mirror-like surface on the underside of the strip of glass. It is then passed to the annealing lehr 12 and it is essential that the rolls 16 be highly polished to maintain this smooth mirror-like surface on the underside of the strip of glass.

Figure 2:
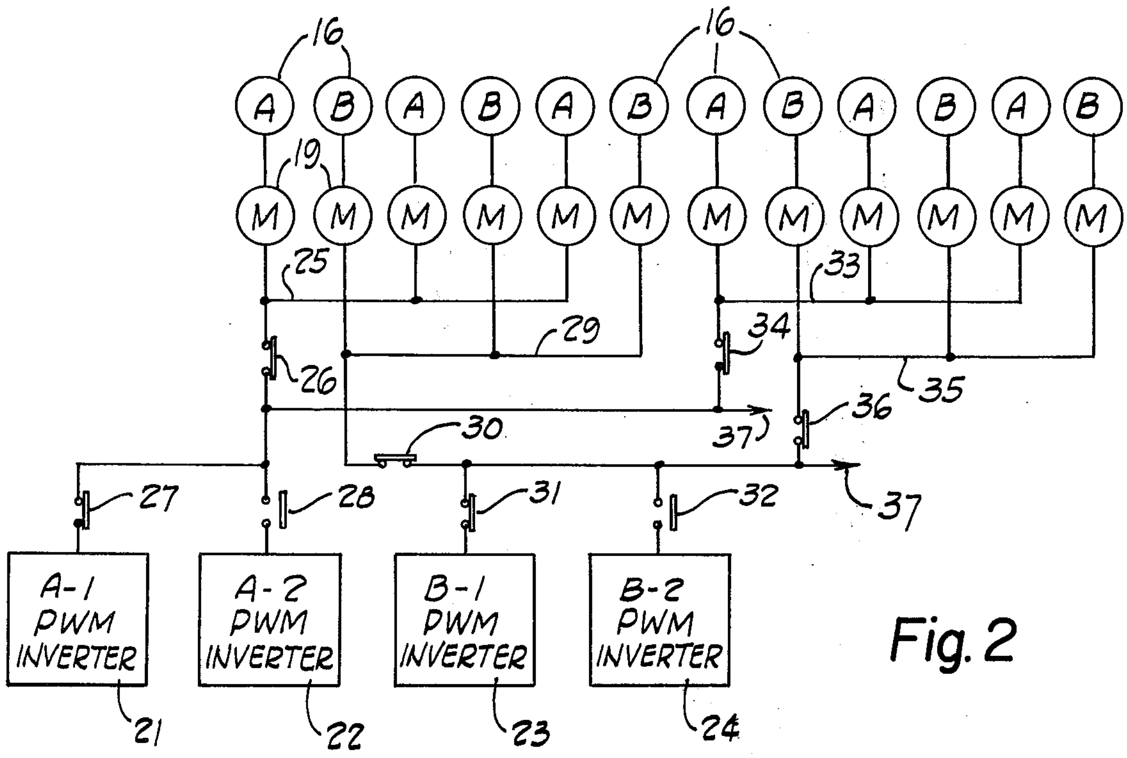
FIG. 2 is a schematic electrical diagram illustrating the electrical connection to the motors in FIG. 1.

A plurality of squirrel-cage synchronous reluctance motors 19 are connected for driving the rolls 16, one motor for each roll. In this preferred embodiment the connection to drive the roll is through a right-angle gear drive 20, again, one for each roll. A plurality of inverters 21–24 are used to supply power to the motors 19. These inverters are all synchronized together, both in frequency and in phase so that mechanical phase register and synchronization of the conveying mechanism rolls 16 is established. These inverters are shown in FIG. 2 which also shows that the rolls 16 are divided into first and second groups, an A Group and a B Group. Since there is one motor for each roll, these motors are also subdivided into an A Group and a B Group. The A Group motors are all connected together on a conductor buss 25, shown diagramatically as a single conductor, although preferably this is a three-phase connection. This conductor buss 25 is connected through a disconnectable electrical connection means shown as switches 26 and 27 to the first inverter 21. Alternatively, the conductor buss 25 may be connected through the switch 26 and a switch 28 to the second inverter 22.

In a similar manner the B Group of motors which drive the B Group of rolls is connected to a conductor buss 29 which in turn is connected to switches 30 and 31 to the third inverter 23, and connected through switches 30 and 32 to the fourth inverter 24. FIG. 2 also shows that the rolls may be divided into sections and the right half of the rolls shown on FIG. 2 are in another section wherein the A Group of roll motors is connected to a conductor buss 33 connected through a switch 34 to either inverter 21 or 22 depending upon whether switch 27 or 28 is closed. Also, the B Group of roll motors is connected to a conductor buss 35 which is connected through a switch 36 to either the inverter 23 or 24 depending upon whether the switch 31 or 32 is closed.

FIGS. 4 and 5 show more of the details of mechanical construction of the drive system 11. Each roll 16 extends transversely of the length of the lehr 12 and has shaft extensions 41 and 42. First and second girders 43 and 44 extend longitudinally along the two sides of the lehr 12. A pair of bearing blocks or pillow blocks 45 and 46 is used to journal the shaft extensions 41 and 42 for each roll 16. Fastening means 47 is provided for each of the bearing blocks 45 and 46 which fastening means is capable of being unfastened from the respective girder to lower downwardly the bearing blocks at each end of a particular roll to move that particular roll out of physical engagement with the strip of glass 17 within the lehr 12. Should a malfunction occur in a given roll or its journal or its associated motor or gear drive 20, it is often necessary to rapidly remove the roll 16 from engagement with the strip of glass 17. To this end the fastening means 17 permits rapid downward movement of such roll 16. The fastening means 47 is shown in this preferred embodiment as including rapidly actuable screw means 48 shown as wing nuts 48, threaded on bolts 49. Also, such rapid actuating fastening means 47 may include the same nut and bolt arrangement on the other side of the bearing block, or, as shown in FIGS. 4 and 5, may include a hinge 50 so that the screw means 48–49 need be actuated on only one side of each such bearing block.

The motor 19 is physically mounted on and carried by the gear drive 20, which in turn is physically mounted on and connected to drive the shaft extension 41 of the roll 16. The gear drive 20 may directly drive the shaft extension, or, as in this preferred embodiment, may drive it through a one-way clutch 52. This one-way clutch 52 has an outer race 53 connected by a flanged stub shaft 54 to the hollow output shaft 55 of the right-angle gear drive 20. The one-way clutch 52 further has an inner race 56 which is keyed to the roll shaft extension 41 and which has bearings 57 for journalling the outer race 53 and has one-way clutch elements 58 which permit driving of the inner race 56 from the outer race 53 in one direction but not in the other. It will be understood that the inner race may be the driving element and the outer race 53 the driven element. In this manner the motor 19, gear drive 20, and one-way clutch 52 are all mounted on and supported by the shaft extension 41 of the roll 16. As viewed in FIG. 4 the roll 16 may be driven in a clockwise direction to transport or convey the strip of glass 17 through the lehr 12. Accordingly, the torque reaction will be counterclockwise on the gear drive 20 and a torque arm 60 is fastened to the gear drive 20 and reacts against a fixed abutment 61 to withstand this torque reaction. This torque arm 60 and the fixed abutment 61 are also so positioned that not only is the torque reaction withstood, but the rapidly actuated yet controlled downward movement of the bearing block 45 is freely permitted. The hollow output shaft 55 of the gear drive 20 permits the gear drive to be directly mounted on the shaft extension 41 or, as shown in FIG. 5, to have the interposition of the one-way clutch 52. Such one-way clutch 52 means that should some malfunction occur in the motor 19 or gear drive 20, or in the electrical connection to the motor 19, and thus the output shaft 55 stop, the strip 17 of glass, by its friction, may continue to cause rolling of the roll 16, as permitted by the one-way clutch 52. Where it becomes necessary to remove the roll 16 from contact with the strip of glass 17, the fastening means 47 may be actuated to rapidly lower the roll 16 out of contact with the sheet 17 and this is permitted by the elongated aperture 63 in the wall of the lehr 12. As shown, the bearing blocks 45 and 46 are fastened on the underside of the girders 43 and 44 to permit this controlled yet rapid lowering of such rolls 16.

FIG. 4 also shows that each individual motor 19 is connected by a flexible conductor 65, an electrical plug 66, and a receptacle 67 in a conductor buss duct 68. Should any malfunction in the motor 19 require its removal, the plug and receptacle 66–67 permits this easy change of the motor 19.

Figure 3:
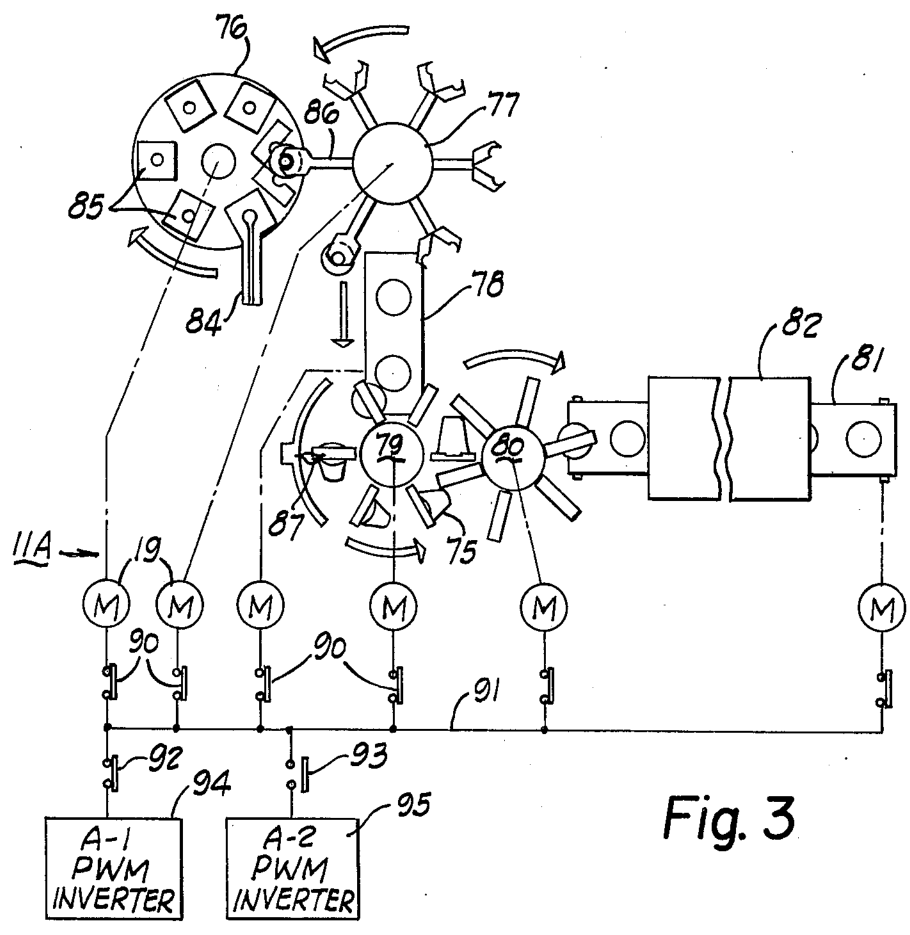
FIG. 3 is a schematic diagram partly mechanical and partly electrical illustrating the invention applied to discrete glass machinery.

FIG. 3 shows an alternative preferred embodiment of the drive system 11A. This drive system 11A is also shown with glass machinery, in this case discrete glass objects illustrated as glass tumblers 75. The drive system includes a plurality of conveying mechanisms to support and move a load with the load ultimately being the glass tumblers 75, but the load also may be considered to be the various parts of the machines. The machines may be of many types and those illustrated are typical with a blowing machine 76, a transfer station 77, a belt conveyor 78, a burn-off machine 79, a transfer station 80, and a belt conveyor 81 to move the discrete glass articles through an annealing lehr 82. The glass machines shown are merely typical of many different forms which such machines may take. For example, the glass-blowing machine 76 may be supplied with glass from a furnace, not shown, through a supply chute 84 with the glass supplied to a plurality of molds 85, in this case shown as six in number for a six-station turret machine. At the 3 O'clock position the molds 85 open and the transfer station 77 has an arm 86 which may close on the tumbler to remove it from the opened molds 85. Next, the transfer station indexes to move the glass tumblers 75 to the belt conveyor 78 which transports the tumblers to the burn-off machine 79. In this machine, at the 9 O'clock position, a flame 87 illustrates a burn-off or other processing which may be used to make a finished and smooth shape to the glass tumblers. The burn-off machine indexes counter-clockwise to move them to the 3 O'clock position whereat the transfer station 80 removes them and by indexing passes them to the belt conveyor 81 so that they may be transported through the annealing lehr 82.

The synchronous motors 19 are connected to drive the various parts of the drive system 11A, in this case illustrated as the various machines, transfer stations and belt conveyors 76–81. These motors 19 are connected through individual disconnectable connection means shown as switches 90 to a conductor buss 91 and connected through another switch 92 to a first inverter 94. As an alternative, if backup protection is desired for the inverter 93, another inverter 95 may be provided and may be alternatively connected to the conductor buss 91 through a switch 93.

In FIG. 3 and also in FIG. 2, there is shown a plurality of inverters. This permits back-up redundancy so that in case of failure of one inverter power may be supplied from an alternate inverter to keep the glass processing line in uninterrupted operation. In FIG. 2 the switches 26 and 34 may be used to achieve start-up. It may not be possible to start all of the many hundred motors across the line at the same time, hence, switches 26 and 34 permit energization of different sections at different times. Switches 27 and 28 would normally not be closed at the same time and switch 27 is shown closed with switch 28 open to illustrate this normal operation. Each of the inverters 21 and 22 has sufficient power output to operate all of the motors of that group A and, thus, inverter 22 is a spare which may be brought on the line and synchronized with inverter 21, should inverter 21, should inverter 21 start to be faulty, and then when inverter 22 is supplying the power to the motors, switch 27 may be opened so that inverter 21 is removed from service. Similarly, inverter 23 would normally supply power to the Group B motors, and inverter 24 would be a spare. The arrows 37 indicate that the conductor busses may be extended to additional sections in the group of motors which may number perhaps 200 or more.

FIG. 3 shows a similar arrangement of inverters 93 and 95 each of which has sufficient power output to supply power to all of the motors 19. The switches 90 may be used for separately starting up various sections of the glass machines and, additionally, may be used to jog the various motors so that the various parts of the machines may be synchronized. For example, if the arm 86 in the 9 O'clock position of the transfer station 77 is not properly in position to receive a tumbler from the open mold of the blowing machine 76, then that particular motor 19 may be jogged to move the arm into the correct position. Also, it could be jogged to move the arm which is shown in the 11 O'clock position into the 9 O'clock position, without changing the position of the blowing machine 76. This permits easy phase synchronization which is a mechanical positioning or angular positioning of the various machine components.

The present invention utilizes motors 19 which are not only synchronous motors but are squirrel-cage synchronous reluctance motors. These, as distinguished from wound rotor machines, have no brushes or current collectors, and, hence, they are rugged and reliable machines; yet, they will run at synchronous speed with good load characteristics. Because of the absence of brushes and current collectors, these motors will operate satisfactorily at the high-ambient temperature conditions found in glass plants, and will thus meet the ultra-high reliability requirements of such plants to avoid breakdowns. Such breakdowns can be quite disasterous financially because if the strip of glass 17 stops moving and the rolls 16 stop moving, then the entire molten bath can be ruined, and also the heat on the rolls 16 can cause a permanent set or sag so that all of these rolls need to be replaced. The success of a float-glass line is dependent on continued operation 24 hours a day for weeks at a time with no down time, because start-ups and shut-downs generally produce waste glass rather than usable glass with a mirror-like finish.

Another important criterion met by the present invention is being able to control the speed of the motors in synchronism from some base or predetermined maximum speed down to zero speed and back up to the base operating speed. This is essential during start-up, and the present invention using inverters 21–24 or 93 and 95 can accomplish this. The inverters may be those as described in the U.S. patent application Ser. No. 422,301 filed on Dec. 6, 1973, by Udo H. Meier entitled "Phase and Frequency Synchronizing Circuit." The inverter disclosed therein is capable of such operation of base or predetermined output frequency down to zero frequency in a smooth positive control. It is a pulse with modulated inverter, and the description contained in that application is incorporated herein by reference. Other inverters have alleged operational frequencies down to substantially zero, but it has been found that motors operating at these low frequencies become unstable and not smooth in operation. Accordingly, such would have been unsuitable for driving the rolls in a lehr, for example, because these rolls must operate not only in synchronism and phase register, but must operate smoothly to avoid marking the float glass. By this combination of squirrel-cage synchronous reluctance motors and inverters which are capable of energizing motors for all speeds from base speed down to a zero speed, a successful drive system for a lehr has been achieved and also a successful drive system for discrete glass machinery has been achieved.

The present disclosure includes that contained in the appended claims, as well as that of the foregoing description. Although this invention has been described in its preferred form with a certain degree of partiuclarity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A drive system comprising, in combination;

a plurality of conveying mechanisms for supporting and conveying a load, a plurality of squirrel cage synchronous motors connected for driving said conveying mechanisms, said synchronous motors being divided into first and second groups, first, second, third and fourth inverters for supplying electrical power to said plurality of motors so that phase register and synchronization of said conveying mechanisms is maintained for all speeds from zero speed to a predetermined maximum speed, each of said inverters being capable of variable frequency output from a predetermined value down to zero frequency to control the speed of said motors in synchronism between a predetermined speed and zero speed, electrical switch means connecting said first group of motors to each of said first and second inverters and connecting said second group of motors to each of said third and fourth inverters.

2. A drive system as set forth in claim 1 wherein the plurality of conveying mechanisms includes a plurality of rolls for conveying a strip material as a load.

3. A drive system as set forth in claim 2 wherein the first group of motors drive alternate rolls along the length of the strip material and the second group of motors drive the remaining alternate motors.

4. A drive system as set forth in claim 3 wherein each of the first and second inverters have sufficient output power to energize all of the first group of motors and each of the third and fourth inverters have sufficient output power to energize all of the second group of motors.

5. A drive system, comprising, in combination, conveyor rolls to support and move a strip of glass-like material through an annealing lehr, first and second girders longitudinally on opposite sides of the lehr, first and second pluralities of bearing blocks, a hinge supporting one side of each bearing block on the respective girder and quick-actuating fastening means securing the opposite side of each bearing block to the respective girder, each roll being journalled in a bearing block of said first and second pluralities, a plurality of motors each motor supported by and driving a respective one of said rolls, said fastening means being capable of being unfastened from the respective girder to lower downwardly the bearing blocks at each end of a particular roll to move that particular roll out of physical engagement with the strip of glass within the lehr.

6. A drive system as claimed in claim 2, wherein said fastening means fastens each bearing block to the underside of the respective girder to establish ready downward movement of said bearing blocks.

* * * * *